June 5, 1956     A. J. KORENAK     2,748,829
STRAIGHTENING DEVICE EQUIPPED WITH AN
OPTICAL PROJECTION TYPE COMPARATOR
Filed Jan. 5, 1955     4 Sheets-Sheet 1

INVENTOR
ANTHONY J. KORENAK
BY
PARKER & CARTER
ATTORNEYS

June 5, 1956
A. J. KORENAK
2,748,829
STRAIGHTENING DEVICE EQUIPPED WITH AN
OPTICAL PROJECTION TYPE COMPARATOR
Filed Jan. 5, 1955
4 Sheets-Sheet 2
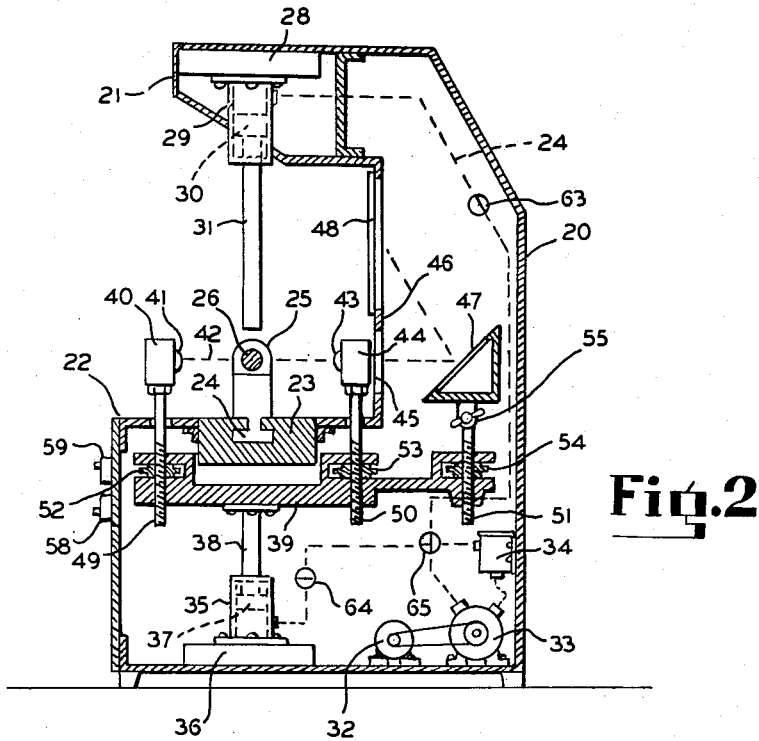
Fig.2
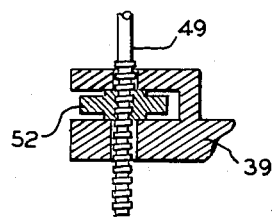
Fig.4
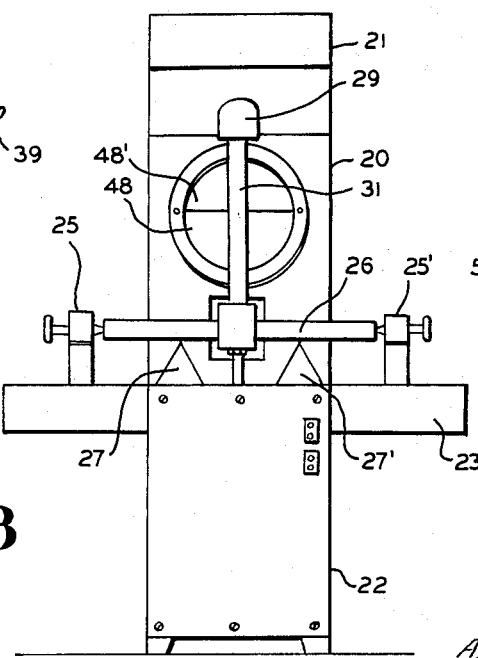
Fig.5
Fig.3
INVENTOR
ANTHONY J. KORENAK
BY
PARKER & CARTER
ATTORNEYS

INVENTOR.
ANTHONY J. KORENAK
BY
PARKER & CARTER
ATTORNEYS

June 5, 1956  A. J. KORENAK  2,748,829
STRAIGHTENING DEVICE EQUIPPED WITH AN
OPTICAL PROJECTION TYPE COMPARATOR
Filed Jan. 5, 1955  4 Sheets-Sheet 4

INVENTOR.
ANTHONY J. KORENAK
BY
PARKER & CARTER
ATTORNEYS

United States Patent Office 2,748,829
Patented June 5, 1956

2,748,829

STRAIGHTENING DEVICE EQUIPPED WITH AN OPTICAL PROJECTION TYPE COMPARATOR

Anthony J. Korenak, Waukesha, Wis.

Application January 5, 1955, Serial No. 479,898

7 Claims. (Cl. 153—52)

My invention relates to straightening devices and more particularly to a straightening device equipped with an optical projection type comparator.

The principal object of my invention is to produce a straightening device in which the workpiece is horizontally supported, the device having an illuminated projection-type comparator to enable the operator to observe the progress of the straightening operation on a vertically disposed projection screen, without removing the workpiece from the device.

Another object of my invention is to provide a straightening device adaptable for and to be incorporated with a conventional projector type of comparator.

Other and further objects of my invention will become more apparent as the description proceeds when taken in conjunction with the drawings, in which:

Figure 2 is a vertical cross section of the assembled device shown in Figure 1.

Figure 3 is a front view of the device shown in Figure 1.

Figure 4 is an enlarged detail cross section of an adjustable screw and nut arrangement within a mounting.

Figure 5 is a perspective detail view of the arrangement shown in Figure 4.

Figure 1:
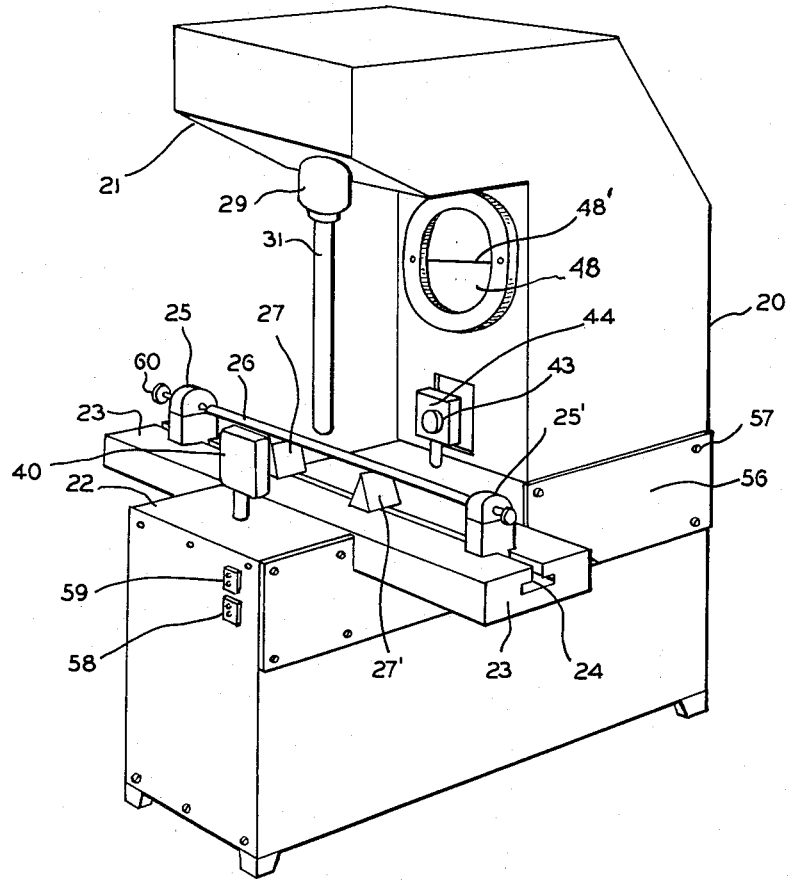
Figure 1 is a perspective view of one form of assembled device made in accordance with my invention, with a workpiece thereon in position for straightening.
Figures 6, 7:
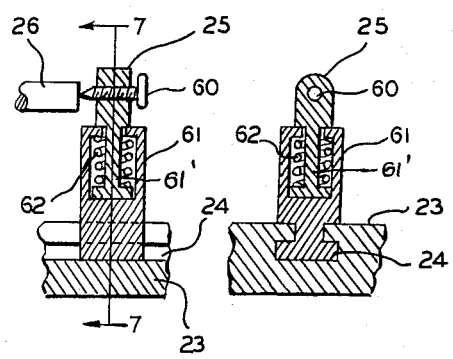
Figure 6 is a detailed longitudinal cross section of an end support for the workpiece.
Figure 7 is a cross section of the end support taken on line 7—7 of Figure 6.

In the use of a straightening device it is imperative that the operator observe the progress made during the straightening operation. It is my purpose to incorporate a straightening device in combination with an illuminated projection type of comparator in which the operator may observe this progress on an illuminated projection screen so as to control the straightening of the workpiece in relation to an indicator line on the screen.

Referring now to details of the embodiment of the invention show in Figures 1 to 10, inclusive, an upright frame or a casing of hollow construction is indicated at 20 which serves as an enclosure for the device. This casing 20 has a forwardly projecting top portion 21 and a hollow base portion 22 which supports a transversely disposed surface plate 23 extending beyond both sides of the casing 20 and having a longitudinal undercut groove 24 therein. This groove is employed for retaining end supports 25 and 25' for supporting a workpiece indicated at 26. The surface plate also supports two knife-edge anvils or blocks 27 and 27'. The end supports 25 and 25' and the knife-edge anvils 27 and 27' may be slidably adjusted along the groove 24 of the surface plate 23 as desired.

The top portion 21 of the casing 20 supports a vertically acting ram assembly which is mounted on a plate 28 in the top portion 21. In the form shown, the ram assembly includes a vertically disposed hydraulic cylinder 29 which has a piston 30 mounted therein, with its piston rod 31 extending downwardly for contact with the workpiece 26 when held in position between the end supports 25 and 25' and upon the anvils 27 and 27'. Obviously, the ram assembly may also be operated pneumatically or manually if desired.

The hydraulic ram assembly is actuated by a motor 32 operating a pump 33 for forcing hydraulic liquid from a suitable reservoir 34 to the cylinder 29 through the tubes 24 shown in dotted lines, and back to the reservoir.

A lower cylinder 35 is mounted on a plate 36, which plate is supported in the interior of the casing 20. This cylinder 35 is provided with a piston 37 having a piston rod 38 extending upwardly and supporting a horizontally disposed plate 39, which is raised upward and downward by means of the actuation of the piston 37 within the cylinder 35, when actuated by means of the hydraulic liquid forced by the pump 33.

The horizontal plate 39 is provided with an upwardly extending housing enclosing a lamp (not shown) which serves as the light source for the comparator. This housing 40 is provided with a lens shown as 41 and transmits a ray of light indicated by the dotted lines 42 horizontally to the workpiece 26 and across to a lens 43 in an enclosure 44. The lens 43 directs the light ray through an opening 45 in the wall 46 of the casing 20, and upon the face of a reflector or mirror 47, so as to throw the image upwardly at an angle to a vertically disposed translucent projection screen 48, supported on the wall 46 of the enclosure 20. Said screen may have a horizontal indicating line 48' thereon. Both the housings 40 and 44 and the angularly disposed reflector 47 are all mounted on adjustable screws 49, 50 and 51. These screws pass through the plate 39 which has nuts 52, 53 and 54 thereon for independent minute adjustment of said screws vertically of said plate.

The reflector 47 is pivotally mounted at 55 to the vertical screw 51 for adjustment on a transverse axis. The casing 20 has a separate plate 56 along one side thereof, which is held in place by screws 57 to give access to the adjusting nuts 52, 53 and 54 for minutely adjusting the enclosures 40 and 44 and the reflector mirror 47, when desired. Plate 56 may overlie the casing 20 as in Figures 1 and 8, or be flush-mounted thereon as in Figure 3.

In practice, the size and location of the workpiece 26 determines the vertical position of the lenses 41 and 43 for projecting the light ray to the reflector 47. This may be accomplished by raising and lowering the entire horizontal plate 39 hydraulically by a push button 58. To adjust the rays minutely, reflected from the lens 41, the enclosures 40 and 44 and the mirror 47 may be separately adjusted by means of the nuts 52, 53 and 54.

The top ram 31 is actuated hydraulically by a push button control 59 so that the ram may be brought down into engagement with the workpiece at a point centrally disposed between the anvils 27 and 27'. In order to permit the bending of the outer ends of workpiece 26, the end support members, shown in Figures 6 and 7, each have an adjusting screw 60 for engaging one end of the workpiece 26. Each screw 60 is threadedly supported in its member 25, which in turn is supported on an upright I-shaped base member 61' guided for vertical movement within an enclosure 61, and having a coil spring 62 thereon to permit upward movement of the screw 60 and the adjacent end of the workpiece, as the ram 31 forces the central part of the workpiece downwardly.

In operation the device is exceedingly simple. The operator slidably adjusts the end support members 25 and 25' to accommodate the ends of the workpiece 26, with the workpiece resting on the knife-edge anvils 27 and 27' which are adjusted to positions at opposite sides of that portion of the workpiece which is to be straightened. As the upper ram 31 is forced downward against the workpiece, the light projected from the lamp within the enclosure 40 will cause reflection of the image of the upper contour of the workpiece upon the projection screen 48, where it is visible to the operator. Thus the operator can watch the progress of the bending operation at all times, and can check the actual amount of deflection assumed by the workpiece from time to time by temporarily withdrawing the ram, without removing the workpiece from its supports.

The adjustment nuts 52, 53 and 54, together with the hingedly supported means 55 of the mirror or reflector 47 make it possible to adjust minutely all three units 40, 44 and 47 so that they are in direct alignment with the upper contour of the workpiece 26. Thus the operation is accurate and uniform when a plurality of identical pieces, one after the other, are being straightened.

The actuation of the hydraulic system shown is controlled by the valves 63, 64 and 65 in the hydraulic line. Obviously the bottom ram 38 remains at a fixed position after it is initially adjusted to its proper level, while the upper ram 31 moves upward and downward as successive straightening operations are performed. The two-way valve 65 permits either the upper or lower ram to be actuated, and the valves 63 and 64 are disposed within the hydraulic line for the individual actuation of the rams 31 and 38, respectively.

In Figures 8, 9, 10 and 11 I show the device operated as described above but modified structurally to offset the projection screen for the convenience of the operator.

Figures 8, 9, 12:
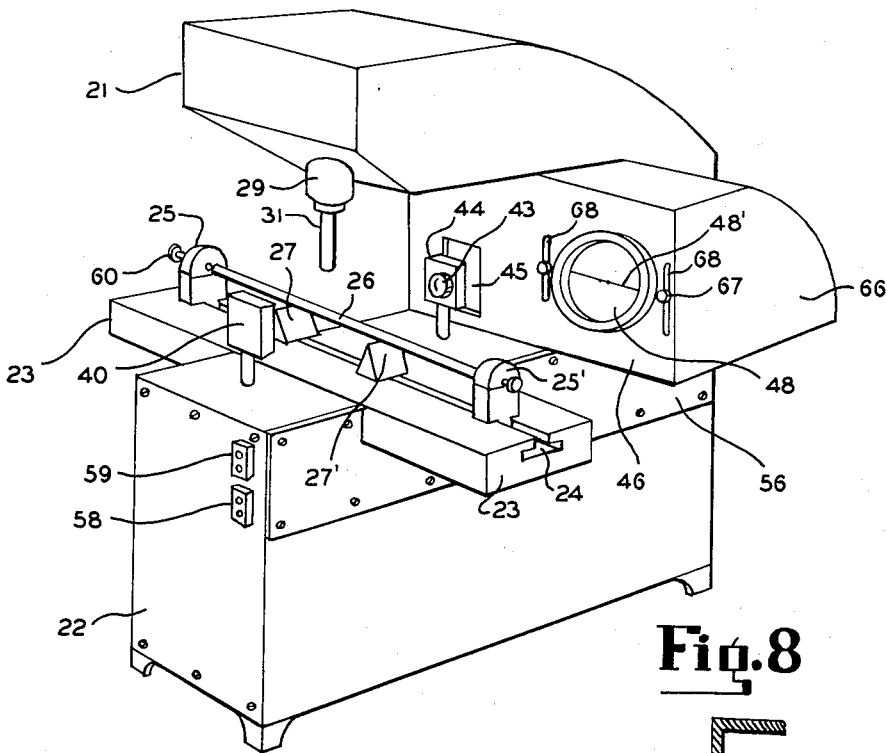
Figure 8 is a perspective view of a modified form of device wherein the projection screen is offset to one side and the straightening ram is shorter and brought down closer to the workpiece.
Figure 9 is a schematic plan view of the manner in which the rays of light are projected by a plurality of mirrors when the projection screen is offset as shown in Figure 8.
Figure 12 is a fragmentary cross section of the wall and slidable mounting of the projection screen.
Figure 10:
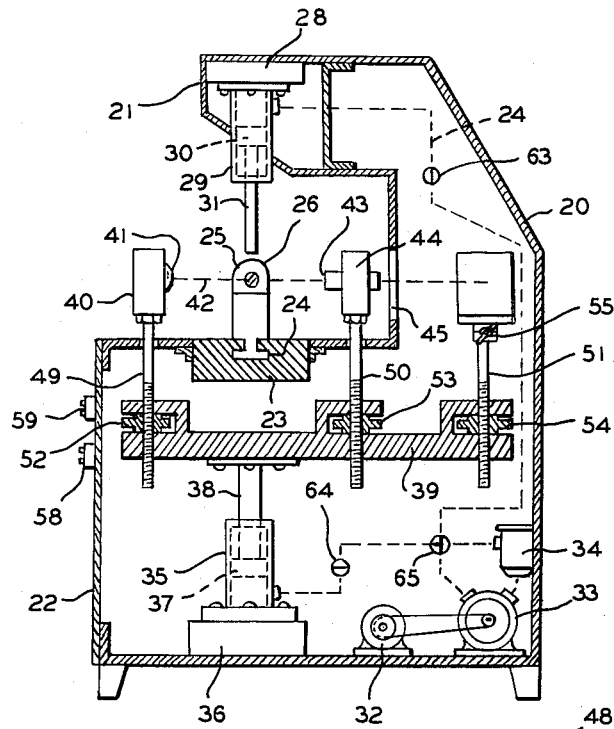
Figure 10 is a vertical cross section of the device shown in Figures 8 and 9 taken on line 10—10 of Figure 9.
Figure 11:
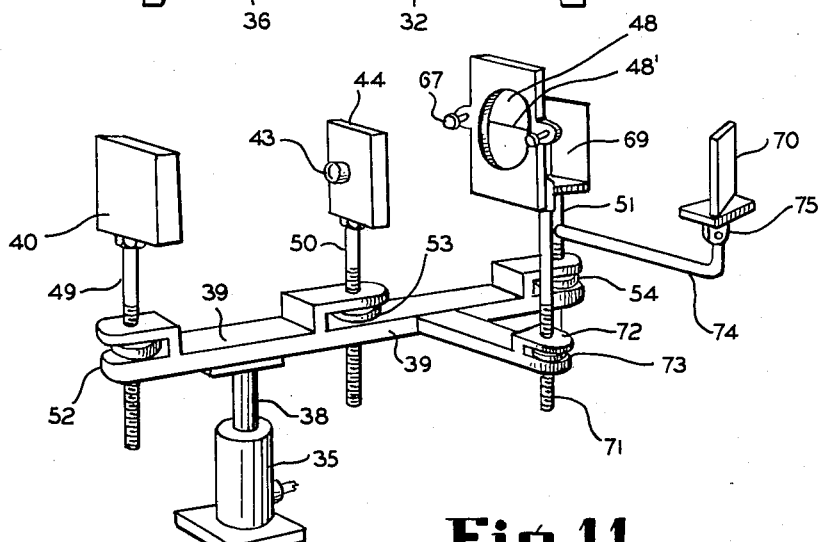
Figure 11 is a perspective view of the adjustable horizontal plate with the light source, reflector mirrors and projection screen adjustably mounted thereon.

In this modified form, the casing 20 has a laterally projecting enclosure portion 66, shown in Figures 8 and 9, and the projection screen 48 is slidably supported by the front wall 46 of the enclosure 66 by means of pins 67 engaging vertical slots 68 in the wall 46. The angular mirror 47, as shown in Figure 2, is replaced by a vertical mirror 69 which is also adjustable at 55 on the vertical screw 51, but instead of projecting the reflection upwardly, as shown in Figure 2, it projects the reflection laterally to another vertical mirror 70 mounted on an arm 74 projecting laterally from a vertical screw 51, as shown in Figure 11, which screw is supported on the rear end of the horizontal plate 39. This vertical screw 51 is adjusted by means of an adjustment nut 54.

The projection screen 48 is supported on a screw 71 on a laterally projecting arm 72 of plate 39 and may be adjusted by nut 73 to obtain its proper line of reflection in relation to the mirror 69 and the screen 48.

As will be seen in Figure 11, the optical system including the light enclosure 40, the lens enclosure 44, the vertical mirror 69, the auxiliary mirror 70, and the projection screen 48 are all mounted on plate 39, so that they can be raised or lowered simultaneously by means of the piston 37 in the hydraulic cylinder 35. This makes it unnecessary, in many instances, to readjust the several parts of the optical system when the vertical position of the plates 39 is changed.

Although I have shown and described certain embodiments of my invention, it will be understood that I do not wish to be limited to the exact construction shown and described but that various changes and modifications may be made without departing from the spirit and scope of the invention as defined by the appended claims.

I claim:

1. In a straightening device an upright hollow frame including a base, a surface plate on said base, workpiece supports adjustable along said surface plate, a light source having a lens disposed on said base forwardly of said surface plate for directing the light ray across a workpiece while the latter is held by said workpiece support, reflector means in said hollow frame, and an upright projection screen mounted on the front wall of said frame rearwardly of said surface plate, said reflector means being disposed to direct a light ray from said light source upon said screen, means for adjusting the light source and the reflecting means vertically relative to said surface plate, and a vertically disposed ram mounted on said frame above said surface plate adapted to engage the workpiece when the latter is held by said workpiece supports, and means for actuating said ram.

2. The structure of claim 1, wherein a second lens is disposed in alignment with the first named lens in opposed relation to the workpiece for transmitting the light ray from the first named lens to the reflecting means.

3. The structure of claim 1, wherein the light source and the reflector means are both mounted on a common supporting plate which is vertically adjustable relative to the base.

4. The structure of claim 3, wherein the light source and the reflector means are also relatively adjustable vertically of the supporting plate.

5. The structure of claim 4, wherein the reflector means and the supporting plate and the adjusting means common to the light source and the reflector means are enclosed within the hollow frame.

6. The structure of claim 4, wherein the projection screen is also mounted for vertical movement on the supporting plate and is supported for vertical slidable movement relative to the front wall of the hollow frame.

7. The structure of claim 5, wherein the projection screen is mounted on the upright frame in laterally offset relation to the light source.

References Cited in the file of this patent

UNITED STATES PATENTS

| | | |
|---|---|---|
| 1,410,691 | McCallum | Mar. 28, 1922 |
| 1,551,715 | Urschel | Sept. 1, 1925 |
| 1,766,800 | Peterson | June 24, 1930 |
| 2,276,941 | Deloghia | Mar. 17, 1942 |
| 2,340,893 | Meister | Feb. 8, 1944 |
| 2,355,910 | Gallasch | Aug. 15, 1944 |
| 2,406,451 | Borkenstein | Aug. 27, 1946 |
| 2,414,871 | Harper | Jan. 28, 1947 |
| 2,416,048 | Evans | Feb. 18, 1947 |
| 2,426,390 | De Forest | Aug. 26, 1947 |
| 2,426,411 | Peterson | Aug. 26, 1947 |
| 2,487,314 | Coles | Nov. 8, 1949 |
| 2,501,087 | Picton | Mar. 21, 1950 |